(12) United States Patent
Roper et al.

(10) Patent No.: US 9,575,651 B2
(45) Date of Patent: Feb. 21, 2017

(54) TOUCHSCREEN SELECTION OF GRAPHICAL OBJECTS

(71) Applicant: LENOVO (Singapore) PTE, LTD., New Tech Park (SG)

(72) Inventors: Matthew Price Roper, Raleigh, NC (US); Matthew Lloyd Hagenbuch, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 229 days.

(21) Appl. No.: 14/144,140

(22) Filed: Dec. 30, 2013

(65) Prior Publication Data

US 2015/0186005 A1    Jul. 2, 2015

(51) Int. Cl.
*G06F 3/048* (2013.01)
*G06F 3/0488* (2013.01)
*G06F 3/0484* (2013.01)

(52) U.S. Cl.
CPC ......... *G06F 3/0488* (2013.01); *G06F 3/04842* (2013.01)

(58) Field of Classification Search
USPC ........ 345/173, 594; 715/810, 701, 702, 256, 715/762, 772, 790, 800, 802, 835, 856, 715/862, 863
See application file for complete search history.

(56) References Cited

U.S. PATENT DOCUMENTS

| | | | | |
|---|---|---|---|---|
| 9,244,601 | B2* | 1/2016 | Kim | G06F 3/0488 |
| 2001/0024195 | A1* | 9/2001 | Hayakawa | G06F 3/04847 345/173 |
| 2008/0189629 | A1* | 8/2008 | Diederiks | G06F 3/04842 715/762 |
| 2010/0153879 | A1* | 6/2010 | Rimas-Ribikauskas | G06F 3/0488 715/810 |
| 2011/0239110 | A1* | 9/2011 | Garrett | G06F 3/0488 715/256 |
| 2013/0147718 | A1* | 6/2013 | Dent | G06F 3/041 345/173 |
| 2013/0191785 | A1* | 7/2013 | Rampson | G06F 3/0488 715/845 |
| 2015/0149964 | A1* | 5/2015 | Bernstein | G06F 3/04815 715/836 |

* cited by examiner

*Primary Examiner* — Doon Chow
*Assistant Examiner* — Wendy Nicholas
(74) *Attorney, Agent, or Firm* — Kunzler Law Group (57) ABSTRACT

For integrating multiple different touch based inputs, a method is disclosed that includes displaying a graphical object on a touch screen device, receiving an input of a user touch of the graphical object on the touch screen, and altering an indicated portion of the touch screen responsive to a characteristic of the touch.

15 Claims, 8 Drawing Sheets

TOUCHSCREEN SELECTION OF GRAPHICAL OBJECTS

BACKGROUND

Field

The subject matter disclosed herein relates to using a touch interface and more particularly relates to the selection of graphical objects using a touchscreen.

Description of the Related Art

In general, computing devices may be configured with a touch based input capability. A computing device with a touch based interface, or input system, may allow a user to communicate with the computing device. Through a touch interface, a user may change settings, execute programs, respond to notifications, or operate the computing device in another way. As the accuracy and sensitivity of touch based technologies increases, more computing devices may offer a touch based interface.

Using a touchscreen may make it difficult to select graphical objects or regions of a touch screen display. Selecting portion of text or a portion of a drawing typically requires some kind of special tool such as "lasso" or similar. Using a "lasso" to select a portion of text or a portion of a graphical display via a touchscreen can be slow, difficult to perform accurately, and difficult to perform consistently.

BRIEF SUMMARY

An apparatus for selecting a graphical object using a touch screen is disclosed. A method and computer program product also perform the functions of the apparatus. In one embodiment, an apparatus includes a processor, a touch screen, and a display module configured to depict a graphical object at the touch screen. In another embodiment, the apparatus includes a selection module configured to indicate a portion of the touch screen at the graphical object. In a further embodiment, the selection module may be further configured to alter the indicated portion of the touch screen, responsive to a characteristic of the touch.

In one embodiment, the apparatus includes a gesture module configured to determine an initial shape of the indicated portion based on a gesture associated with the touch. In another embodiment, the selection module is further configured to select the indicated portion and the apparatus further includes an action module. In a further embodiment, the action module may perform one or more operations on the selected portion. In one embodiment, the operations include one or more of cutting, pasting, editing, deleting, spell checking, highlighting, altering, converting, and moving.

In one embodiment, the characteristic of the touch is selected from the group consisting of an amount of pressure, a size, and a duration. In another embodiment, the touch module further includes a pressure module. In a further embodiment, the pressure module senses the amount of pressure.

In one embodiment, altering the indicated portion includes increasing a size of the indicated portion responsive to an increase in one of the amount of pressure of the touch, and the duration of the touch. In another embodiment, the graphical object is a word, the indicated portion beginning at the word and increasing to indicate neighboring words. In a further embodiment, the altering includes snapping the indicated portion to detected edges of the graphical object.

A method is disclosed that includes displaying a graphical object on a touch screen. In one embodiment, the method includes receiving an input of a user touch of the graphical object on the touch screen. In another embodiment, the method includes altering an indicated portion of the screen responsive to a characteristic of the touch.

In one embodiment, the characteristic is selected from the group consisting of an amount of pressure, a size, and a duration. In another embodiment, a rate of change for the indicated portion is based on the amount of pressure. In a further embodiment, a size of the indicated portion is based on the amount of pressure. In one embodiment, the graphical object is text, the text being one of handwritten text and typed text. In another embodiment, the touch touches a word of the text, the indicated portion beginning at the word and increasing to select neighboring words responsive to one or more of the pressure and the duration. In a further embodiment, the neighboring words include one of a line, multiple lines, a sentence, a paragraph, a page, a chapter, and a composition.

In one embodiment, the method includes after the altering, selecting the indicated portion of the touch screen. In another embodiment, the method includes performing one or more operations on the selected portion. In one embodiment, the operations include one or more of cutting the portion, pasting the portion, highlighting the portion, editing the portion, deleting the portion, spell checking the portion, altering the portion, and moving the portion.

In one embodiment, the method includes sensing a gesture at the screen, the gesture indicating an initial shape of the indicated portion. In another embodiment, the altering the indicated portion includes snapping the indicated portion to detected edges of the graphical object A program product is disclosed including a computer readable storage medium storing machine readable code executable by a processor to perform operations. In one embodiment, the operations include displaying a graphical object on a touch screen device. In another embodiment, the operations include receiving at touch at the touch screen device, the touch touching the graphical object. In a further embodiment, the operations include indicating an initial portion of the touch screen at the graphical object. In one embodiment, the operations include altering the indicated portion responsive to a characteristic of the touch.

In one embodiment, the characteristic of the touch is selected from the group consisting of an amount of pressure, a size, and a duration. In another embodiment, the altering includes increasing the indicated portion and snapping the indicated portion to detected edges of the graphical object.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements.

In order to address the current state of the art, the present application discloses several embodiments of a method, system, and apparatus for touch screen selection of graphical objects for a computing device.

In one embodiment, an apparatus may include a touch screen. A touch screen may include a wide variety of display technologies including, but not limited to, digital light processing, cathode ray tube, liquid crystal, plasma, light emitting diode, organic light emitting diode, or other, or the like, as one skilled in the art may appreciate. A touch screen may or may not be physically integrated with the touch module, or touch sensors for the touch screen device.

Computing device at least means a device capable of performing logic operations. A computing device may include a process, memory, display, or the like. For example, a computing device, may be a personal computer, a handheld computer, a mobile device, a cellular phone, a tablet computer, a laptop computer, or other, or the like. A computing device, as described herein, may also include one or more touch based inputs for the screen. A touch based input may include a touch sensor with a module for communicating with the touch sensor. This may allow a user to interface with the computing device, by touching the screen to select buttons, type, input text, draw a line, select icons, execute a program, change a setting, respond to a notification, or the like.

A touch, as described herein, may mean at least interacting with the computing device so as to cause one or more touch sensors to detect a touch. In some embodiment, a touch may include physically contacting a touch sensor of the computing device. For example, a resistive touch sensor may detect a touch after a finger pressed on the resistive touch sensor. In another example, a touch may be by a passive stylus, or a finger touching a touch screen. In another example, a touch may be by an active stylus, or a pen touching a touch screen.

In another embodiment, a touch may include coming close to the touch sensor, but not physically contacting the touch sensor. For example, a capacitive touch sensor may detect a touch if a finger, active stylus, or other device, comes close enough to the capacitive touch sensor to affect the capacitance of the touch sensor. In another example, a touch sensor that includes a magnetic resonance pen, may detect a disturbance in a magnetic field based on a specialized pen coming close to a magnetic resonance touch sensor. In a further example, a touch may include an active stylus being placed within a sensor range of a sensor for the active stylus. Therefore, a "touch" a described herein, is not limited to any kind of physical contact, and any spatial proximity that affects a touch sensor of any kind may be considered a touch, even if from some distance away from the computing device.

As described herein, a touch sensor may include a variety of different touch technologies. A touch sensor may include resistive technologies such as two electrically-resistive layers separated by a thin space. A touch may be sensed by applying a voltage to one of the layers and detecting a voltage change when a portion of one of the layers comes in contact with the other layer based on the layer being physically moved.

A touch sensor may include surface acoustic wave technologies that may use ultrasonic saves that pass over a screen. A physical object approaching the screen may obstruct or absorb a portion of the ultrasonic wave. A change in the ultrasonic wave may be detected by the touch sensor.

A touch sensor may include capacitive touch technologies such as a panel of glass coated with a transparent conductor. A capacitive touch sensor may detect a distortion of an electrostatic field based on a change in capacitance. A capacitive touch sensor may not detect a touch by a physical object that is an electrical insulator. A capacitive touch sensor may be based on capacitive coupling, surface capacitance, projected capacitance, mutual capacitance, self-capacitance, or the like.

A touch sensor may include an infrared grid using an array of infrared LED's and photodetector pairs on the edges of a screen. A touch sensor may include infrared acrylic projection, optical imaging, dispersive signal technology, acoustic pulse recognition, or the like.

Figure 1:
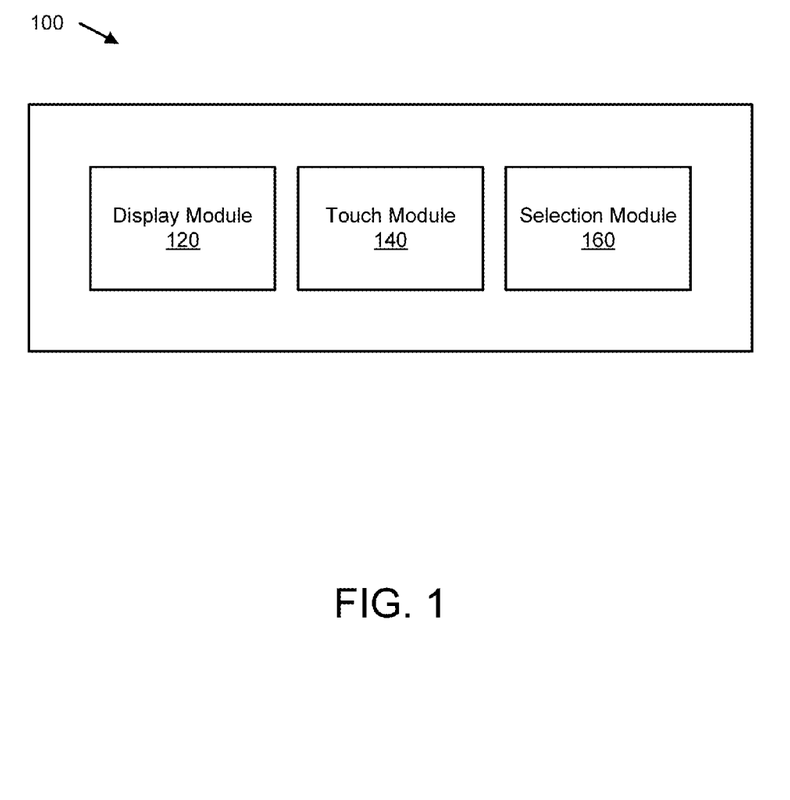
FIG. 1 is a schematic block diagram illustrating one embodiment of an apparatus for touch screen selection of graphical objects.

FIG. 1 is a schematic block diagram illustrating one embodiment of an apparatus for touch screen selection of graphical objects. In one embodiment, an apparatus includes a display module 120, a touch module 140, and a selection module 160.

In one embodiment, the display module 120 may be configured to depict a graphical object at a screen of a computing device. The graphical object may include any graphical depiction, arrangement of shapes, colors, figures, lines, or the like. A graphical object may also include handwritten text, typed text, or any other information capable of being displayed via a screen of a computing device. In one example, a graphical object may be a depiction of a handwritten word. In another example, a graphical object may be a portion of an object in a photograph. In another example, a graphical object may include a sentence, or other sequence of words or characters. In another example, a graphical object may include a set of objects that share some commonality in color, texture, location, or the like.

In another example, a portion of a textual composition may be displayed at a touch screen of the computing device. The display module 120 may depict the portion of the composition in rows of text, and the current screen may display several rows of text, and/or paragraphs of text, or the like.

In another embodiment, an apparatus may include the touch module 140. In one embodiment, the touch module 140 may communicate with any of the touch sensors previously described, or to be developed touch sensors, or the like.

In one embodiment, the touch module 140 may communicate with any of the previously described touch sensors, or touch sensor types. The touch module 140 may include a touch sensor, or may communicate with a touch sensor. In another embodiment, the touch module 140 may concurrently communicate with more than one touch sensor. The touch module may be configured to detect a touch at the graphical object. In one embodiment, the touch module 140 may communicate with a wide variety of sensors to determine an amount of pressure at the touch, a size of the touch, and/or a duration of the touch. In another embodiment, the touch module 140 may detect a size of the touch. The touch may be based on any of the previously described sensor types.

The selection module 160 may be configured to indicate a portion of the screen. A portion of the screen indicated by the selection module 160 may begin at the graphical object. The selection module 160 may be configured to alter the indicated portion of the touch screen responsive to a characteristic of the touch. In one embodiment, a characteristic of the touch may be an amount of pressure at the touch, a detected size of the touch, and a duration of the touch.

In another embodiment, the selection module 160 may increase the indicated portion at the touch point responsive to one of an amount of pressure, a size, and a duration of the touch. In one example, the selection module 160 may receive a configuration parameter that indicates whether to expand or contract based on the one of an amount of pressure and a duration. A wide variety of different settings or parameters stored in a memory of a computing device may be used to determine how to alter the indicated portion based on characteristics of the touch. In one example, a single tap may indicate to expand based on the pressure or duration. In another example, a double tap may indicate to contract based on the pressure or duration.

In one embodiment, the indicated portion may begin with a defined shape, wherein the selection module 160 may expand the defined shape responsive to a characteristic of the touch. In a further embodiment, the defined shape may be based on a size of the touch. In another embodiment, the indicated portion may begin with the defined shape, and the defined shape may contract responsive to either an amount of pressure or a duration of time. In certain examples, the initial shape, may be a circle, an oval, a square, a rectangle, a trapezoid, a rhombus, an octagon, a polygon, another symmetrical shape, an asymmetrical shape, another polygon, or the like.

In one embodiment, the selection module 160 may expand the indicated portion responsive to an amount of pressure. In another embodiment, the selection module 160 may contract the indicated portion responsive to an amount of pressure. In one embodiment, the selection module 160 may expand the initial shape responsive to an amount of time. In one embodiment, an initial portion may contract responsive to an amount of time. In one example, the touch module 140 may sense a touch and the selection module 160 may indicate a selection shape. Therefore, in one embodiment, the indicated portion may be a selection shape. The selection module 160 may monitor an amount of pressure at the touch screen and either expand or contract a size of the selection shape based on the amount of pressure measured.

In one example, the selection module 160 may indicate a small selection shape in response to little or no pressure measured. A small selection shape may be substantially the same size as a sensed touch. In another example, the selection module 160 may indicate a large selection shape in response to a maximum amount of pressure measured. A large selection shape may be substantially the size of a display for the apparatus 100. Therefore, in one embodiment, a size of a selection shape may be at a consistent ratio according to a measured pressure at a touch screen of the apparatus 100. The ratio may include a minimum pressure resulting in a small selection shape, and a maximum pressure resulting in a large selection shape. In other embodiment, the selection module 160 may indicate another size of a selection shape based on a sensed pressure between a minimum pressure and a maximum pressure.

In another embodiment, the selection module 160 may indicate a size of a selection shape responsive to a pressure at a touch screen of the apparatus 100. In this embodiment, the size of the selection shape may not be a ratio based on a size of the display for the apparatus 100, but may be a pre-defined size. In one example, a pre-defined small size, responsive to a minimum amount of pressure may be a few centimeters wide. In another example, a pre-defined large size, response to a minimum amount of pressure may be 10 inches wide, or larger. In scenarios where a pre-defined size may be larger than a display for the apparatus 100, only a portion of the large selection shape may be displayed.

In another embodiment, the selection module 160 may detect a graphical object displayed on a display screen of the apparatus 100. The selection module 160 may perform a variety of different image processing algorithms, such as, but not limited to, edge detection, object recognition, color matching, or the like. In one embodiment, the selection module 160 may limit expanding of the selection shape based on detected edges of a graphical object. In another embodiment, the selection module 160 may limit contracting of the selection shape based on detected edges of a graphical object. Therefore, in one embodiment, the selection module 160 may make small adjustments to the size of the selection shape based on detected edges of a graphical object. For example, if the size of a selection shape is similar to a width of a graphical objects, or the detected edges of a graphical object, the selection module 160 may adjust either expand or contract the size of the indicated portion to be substantially similar to the detected edges of the graphical object.

In another embodiment, the selection module 160 may alter the shape of the indicated portion to correspond to a shape of the graphical object. In response to additional pressure measured by the selection module 160, the selection module 160 may alter the size of the indicated portion to exceed the size of the graphical object. In response to the touch module 140 sensing less pressure, the selection module 160 may decrease the size of the indicated portion to be less than the size of the graphical object. In response to a change in pressure, the selection module 160 may alter the indicated portion to be consistent with the initial selection shape. Therefore, in certain embodiments, the selection module 160 may indicate a size of a selection shape, based on graphical object displayed at a touchscreen of the apparatus 100. In other embodiment, the selection module 160 may limit the expanding based on detected edges of the graphical object. In a further embodiment, the selection module 160 may alter the selection shape, or the indicated portion to detected edges of the graphical object. Altering the shape may include rotating the selection shape, expanding the selection shape, contracting the selection shape, altering boundaries of the selection shape, altering dimensions of the selection shape, expanding or contract one axis of the selection shape, or the like.

In one embodiment, the selection module 160 may select a currently indicated selection in response to the touch module 140 sensing a decrease of the pressure to be substantially zero pressure. In another embodiment, the selection module 160 may wait a period of time before selecting the indicated selection. For example, the selection module 160 may wait for 400 milliseconds after the touch module 140 senses a pressure drop to substantially zero pressure, and if no subsequent increased pressure is sensed by the touch module 140, before the 400 milliseconds, then the selection module 160 may select the indicated selection. If the touch module 140 senses an increase in pressure before the 400 milliseconds expires, then the selection module 160 may again alter a size of the selection shape based on the amount of sensed pressure.

In another embodiment, the selection module 160 may indicate a size of a selection shape responsive to a duration of time for a sensed touch by the touch module 140 at a touch screen of the apparatus 100. An initial size of the selection shape may be small or large as previously described. In one embodiment, the selection module 160 may limit expanding of the selection shape based on detected edges of a graphical object. In one embodiment, the selection module 160 may limit the contracting of the selection shape based on detected edges of a graphical object. Similarly, as with pressure, in one embodiment, the selection module 160 may make small adjustments to the size of the selection shape based on detected edges of a graphical object.

In another embodiment, the selection module 160 may alter the shape of the selection object to correspond to a shape of the graphical object. In one embodiment, as the touch module 140 senses the touch over a duration of time, the selection module 160 may gradually increase a size of the selection shape. As the selection shape approaches a size of a detected graphical object, the selection module 160 may increase the size of the selection shape to substantially encompass the detected graphical object. In another embodiment, the selection module 160 may alter the shape or dimensions of the selection shape so as to encompass the detected graphical object. In one example, a selection shape may be a circle and a graphical object may be a square. In response to the circle selection shape being substantially the same width as the square graphical object, the selection module 160 may alter the selection shape to a square to coincide with detected edges of the square graphical object.

In response to the touch module 140 detected a touch for additional time, the selection module 160 may increase the size of the selection object to exceed the size of the graphical object. In one embodiment, the selection module 160 may alter the shape of the selection shape back to the initial selection shape. In another embodiment, the selection module 160 may not alter the selection shape after surpassing the graphical object. In one embodiment, the selection module 160 may select a currently indicated selection in response to the touch module 140 no longer sensing a touch. In another embodiment, in response to the touch module 140 no longer sensing a touch, the selection module 160 may select the indicated selection.

In another embodiment, the touch module 140 may sense a touch and a pressure of the touch at a touchscreen of the apparatus 100. As previously described, the selection module 160 may gradually expand a selection shape in response to pressure sensed by the touch module 140. In one embodiment, a rate of expansion or contraction for the selection shape may be based on an amount of pressure sensed by the touch module 140. In one example, the selection module 160 may increase a rate of expansion or contraction for the selection shape in response to the touch module 140 sensing an increase in pressure. In another example, the selection module 160 may decrease a rate of expansion or contraction of the selection shape in response to the touch module 140 sensing a decrease in pressure. As previously described, in response to a decrease in pressure to substantially zero pressure, the selection module 160 may select a portion of the display based on a portion indicated by the selection shape.

In another embodiment, the selection module 160 may select a portion of the display based on a current indicated portion in response to the touch module 140 sensing another touch at a touch screen of the apparatus 100. The touch module 140 may sense the other touch based on a similar touch sensor type, another touch sensor type, or the like.

Figure 2:
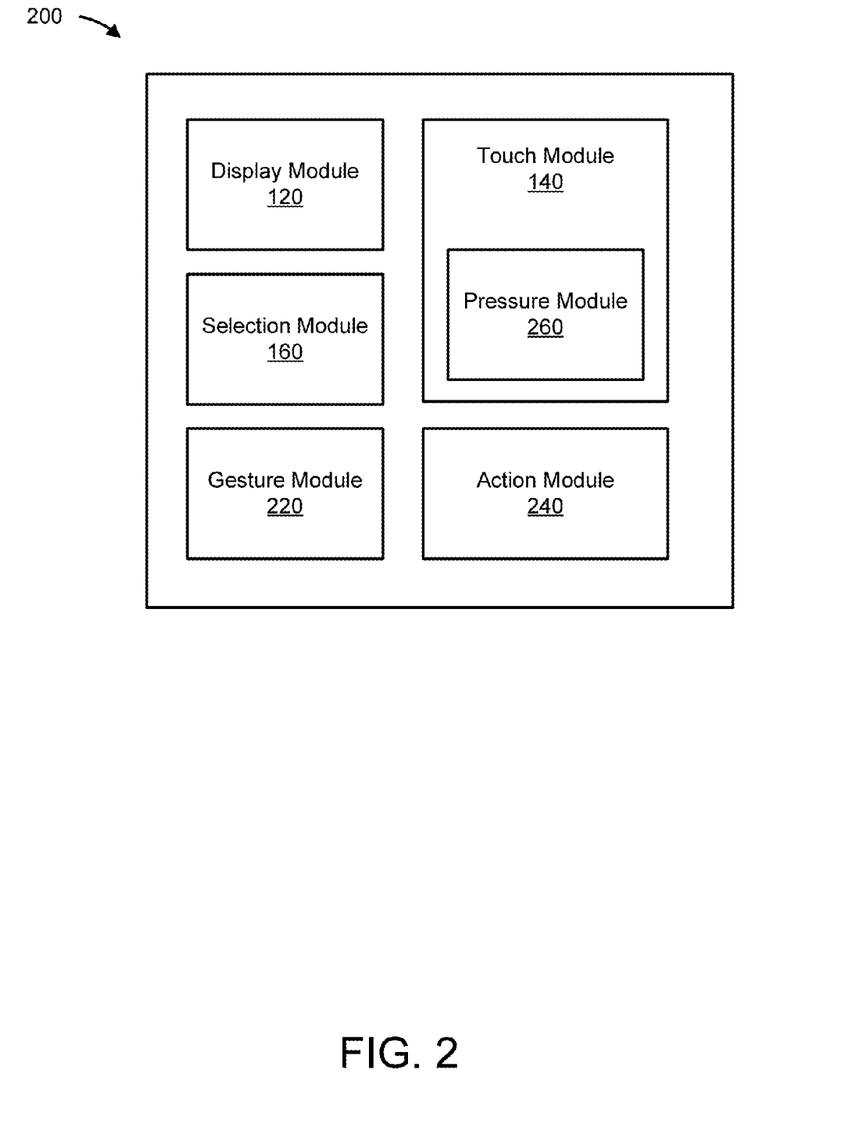
FIG. 2 is another schematic block diagram illustrating one embodiment of an apparatus for touch screen selection of graphical objects.

FIG. 2 is another schematic block diagram illustrating one embodiment 200 of an apparatus for touch screen selection of graphical objects. In one embodiment, the apparatus 200 may include the display module 120, the touch module 140 including a pressure module 260, the selection module 160, a gesture module 220, and an action module 240. The display module 120, the selection module 160 and the touch module 140 may or may not be substantially similar to modules depicted in FIG. 1.

In one embodiment, the touch module 140 may include the pressure module 260. The pressure module 260 may perform substantially similar functions as the touch module 140 from FIG. 1. In one embodiment, the pressure module 260 may include a mechanical switch to detect a pressure at a screen of the apparatus 200. For example, pressure on a screen may collapse or close a mechanical switch to close a circuit that may indicate a threshold pressure has been reached. A pressure threshold may be set based on a spring opposing the mechanical switch. In response to a touch exceeding a pressure threshold, the selection module 160 may alter an indicated portion of the touch screen.

In another embodiment, the pressure module 260 may include a touch tool connected to a computing device. A touch tool may include a variety of pressure sensors. For example, a touch tool may include a mechanical pressure sensor at a tip of a pen or a stylus. The touch tool may transmit a sensed pressure to the pressure module 260. Therefore, in certain embodiments, the pressure module 260 may communicate with a pressure sensor that is at a touch screen of a computing device, or at a touch tool for the computing device.

In another embodiment, the pressure module 260 may include a piezoresistive strain gauge. A strain gauge may be connected to a Wheatstone bridge to maximize the output of the sensor and to reduce sensitivity to errors. In another embodiment, the pressure module 260 may include a diaphragm and pressure cavity to create a variable capacitor to detect strain due to applied pressure. In one embodiment, the pressure module 260 may include an electromagnetic sensor that may measure displacement of a diaphragm by means of measuring changes in inductance. In another embodiment, the pressure module 260 may measure a piezoelectric effect in a material such as, but not limited to, quartz, or the like. In one embodiment, the pressure module 260 may measure a physical change in an optical fiber to measure strain due to an applied pressure. For example, the pressure module 260 may use a Fiber Bragg Grating. In another embodiment, the pressure module 260 may use a potentiometric sensor to detect strain cause by an applied pressure.

In one embodiment, the pressure module 260 may use a quantum tunneling composite that sandwiches a conductive composite layer between touchscreen layers. In another embodiment, the pressure module 260 may use capacitive deflection to indicate pressure. For example, depending on an amount of capacitive deflection, the pressure module 260 may determine that a certain amount of pressure is being applied to a screen. In one embodiment, the pressure module 260 may determine pressure based on a pattern via a resistive touch sensor. For example, a larger touch pattern may indicate that more pressure is applied to a screen, whereas a smaller touch pattern may indicate that less pressure is applied to a screen. Of course, other pressure sensing techniques may be used, as one skilled in the art would appreciate, and this application is not limited in this regard.

The pressure module 260 may sense the variety of pressures sensed by the touch module 140 as previously described. The pressure module 260 may sense pressure based a wide variety of different pressure sensors. In another embodiment, the selection module 160 may indicate a size of a selection shape responsive to a pressure sensed by the pressure module 260 at a touch screen of the apparatus 200.

In one embodiment, the selection module 160 may select a currently indicated selection in response to a decrease of the pressure to be substantially zero pressure. In another embodiment, the selection module 160 may wait a period of time before selecting the indicated selection. For example, the selection module 160 may wait for 400 milliseconds after a pressure drops to substantially zero pressure, and if no subsequent increased pressure is sensed before the 400 milliseconds, then the selection module 160 may select the indicated selection. If the selection module 160 senses an increase in pressure before the 400 milliseconds expires, then the selection module 160 may again modify a size of the selection shape based on the amount of sensed pressure.

In another embodiment, the apparatus 200 may include the gesture module 220. The gesture module 220 may be configured to determine an initial shape of an indicated portion of the display of the apparatus based on a gesture associated with a touch sensed by the touch module 140. The gesture module 220 may be further configured to indicate to the selection module 160 how to alter the indicated portion. In one example, a circle gesture may indicate to expand at the touch point. In another example, a half circle may indicate to the selection module 160 to begin with a large selection shape and contract responsive to pressure or a duration of a touch. Of course, this disclosure is not limited in this regard as a wide variety of different indicators may be used to indicate whether to expand or contract based on a pressure or a duration of a touch.

In one example, the gesture module 220 may sense a line drawn at a touch screen of the apparatus. In response to a sustained touch, the selection module 160 may indicate a portion of the screen based on the sensed line by the gesture module 220. In response to either an increase in pressure, or a duration of time for the touch, the selection module 160 may gradually expand or contract the sensed line. In one example, the indicated portion may gradually expand as a rectangle with a width to be similar to the length of the line sensed by the gesture module 220.

In another example, the gesture module 220 may sense a circle drawn at a touch screen of the apparatus. In response to a sustained touch following the gesture, the selection module 160 may indicate a portion of the screen by forming a circle at the sustained touch. The initial size of the circle may be small or large as previously described. The initial size of the circle may be configured by a user of the apparatus 200. In response to the sustained touch, the selection module 160 may gradually expand the circle as previously described. In response to the sustained touch, the selection module 160 may gradually contract the initial circle.

In another example, the gesture module 220 may sense a rectangle drawn at a touch screen of the apparatus. In this example, the selection module 160 may indicate a portion of the display based on the sensed drawn rectangle at the touch screen of the apparatus 200. In response to an amount of pressure or a duration of time, the selection module 160 may expand or contact the size of the rectangle to indicating varying portions of the screen as previously described.

In another example, the gesture module 220 may sense another polygon drawn at a touch screen of the apparatus 200. The selection module 160 may indicate a portion of the display based on the sensed polygon at the touch screen of the apparatus 200. The selection module 160 may expand a size of the polygon responsive to an amount of pressure sensed by the pressure module 260, or a duration sensed by the touch module 150. In another example, the selection module 160 may contract a size of the polygon responsive to an amount of pressure sensed by the pressure module 260 or a duration sensed by the touch module 150.

In another example, the gesture module 220 may sense another enclosed shape drawn at a touch screen of the apparatus 200. The selection module 160 may indicate a portion of the display based on the enclosed shape. The selection module 160 may expand a size of the enclosed shape to snap to detected edges of a graphical object as previously described. Of course this disclosure is not limited in this regard, and may other shapes, forms, enclosures, or the like may be used to indicate a portion of a touch screen.

In another example, the gesture module 220 may sense another enclosed shape drawn at a touch screen of the apparatus 200. The selection module 160 may indicate a portion of the display based on the enclosed shape. The selection module 160 may contract a size of the enclosed shape to snap to detected edges of a graphical object. Of course this disclosure is not limited in this regard, and may other shapes, forms, enclosures, or the like may be used to indicate a portion of a touch screen.

In another embodiment, the apparatus 200 may include the action module 240. The action module 240 may be configured to perform one or more operations on a selection portion of the screen. In another embodiment, the selection module 160 may select a currently indicated portion of the touch screen, and the operations may be selected from the group comprising cutting the selection portion, pasting a selected portion, editing a selected portion, deleting a selected portion, spell checking a selected portion, altering a selected portion, converting a selected portion, and moving a selected portion.

In one embodiment, the action module 240 may display a menu of choices to a user in response to the selection module 160 selecting a portion of the display. In one example, the menu may include choices, such as, but not limited to, cut, paste, delete, edit, highlight, add note, spell check, alter, convert, move, resize, or the like. Of course, a wide variety of operations may be performed on a selected graphical portion of a screen, and this disclosure in meant to include all such operations, as one skilled in the art may recognize.

Figure 3:
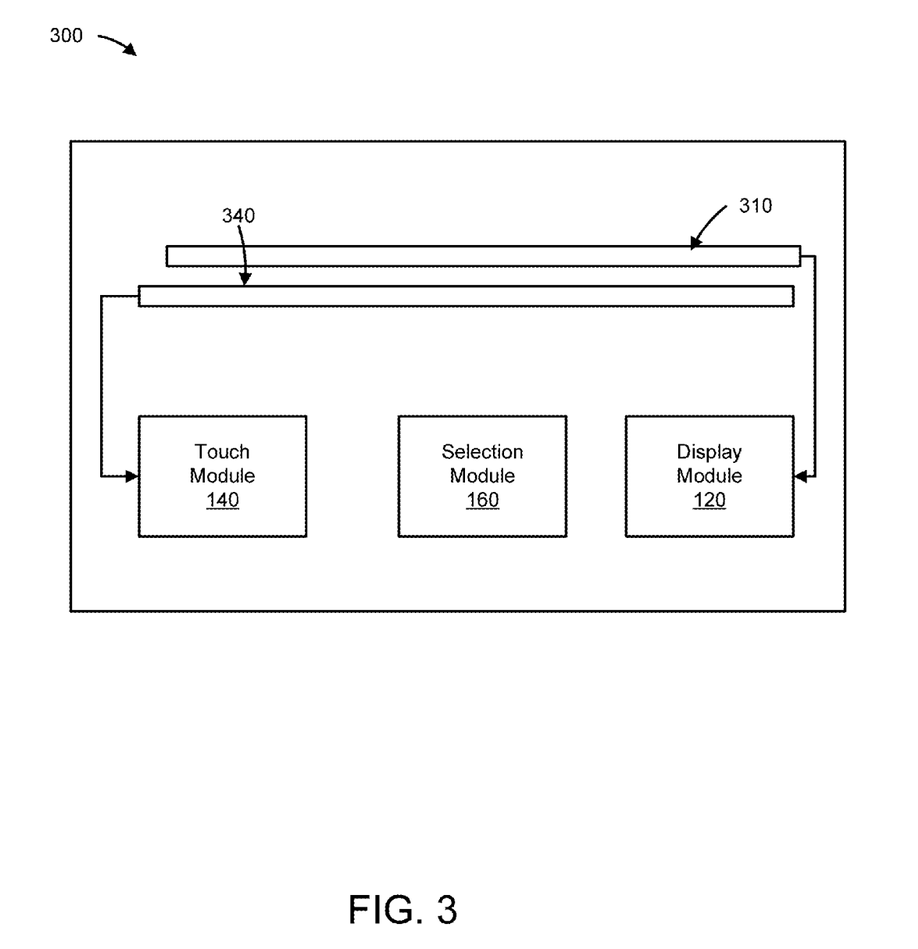
FIG. 3 is a schematic block diagram illustrating one embodiment of a system for touch screen selection of graphical objects.

FIG. 3 is a schematic block diagram illustrating one embodiment of a system for touch screen selection of graphical objects. In one embodiment 300, the apparatus may include a touch screen 310, a touch sensor 340, the touch module 140, the selection module 160 and the display module 120.

The display module 120 may depict a graphical object at the screen 310. The touch module 140 may detect a touch based on input from a touch sensor 340. In one example, the touch may be collocated with the displayed graphical object at the screen 310. In another example, the selection module 160 may indicate a portion of the screen 310. In one embodiment, the portion of the screen may begin at the detected touch and the selection module may alter an indicated portion of the touch screen responsive to a characteristic of the touch, as previously described.

Figure 4:
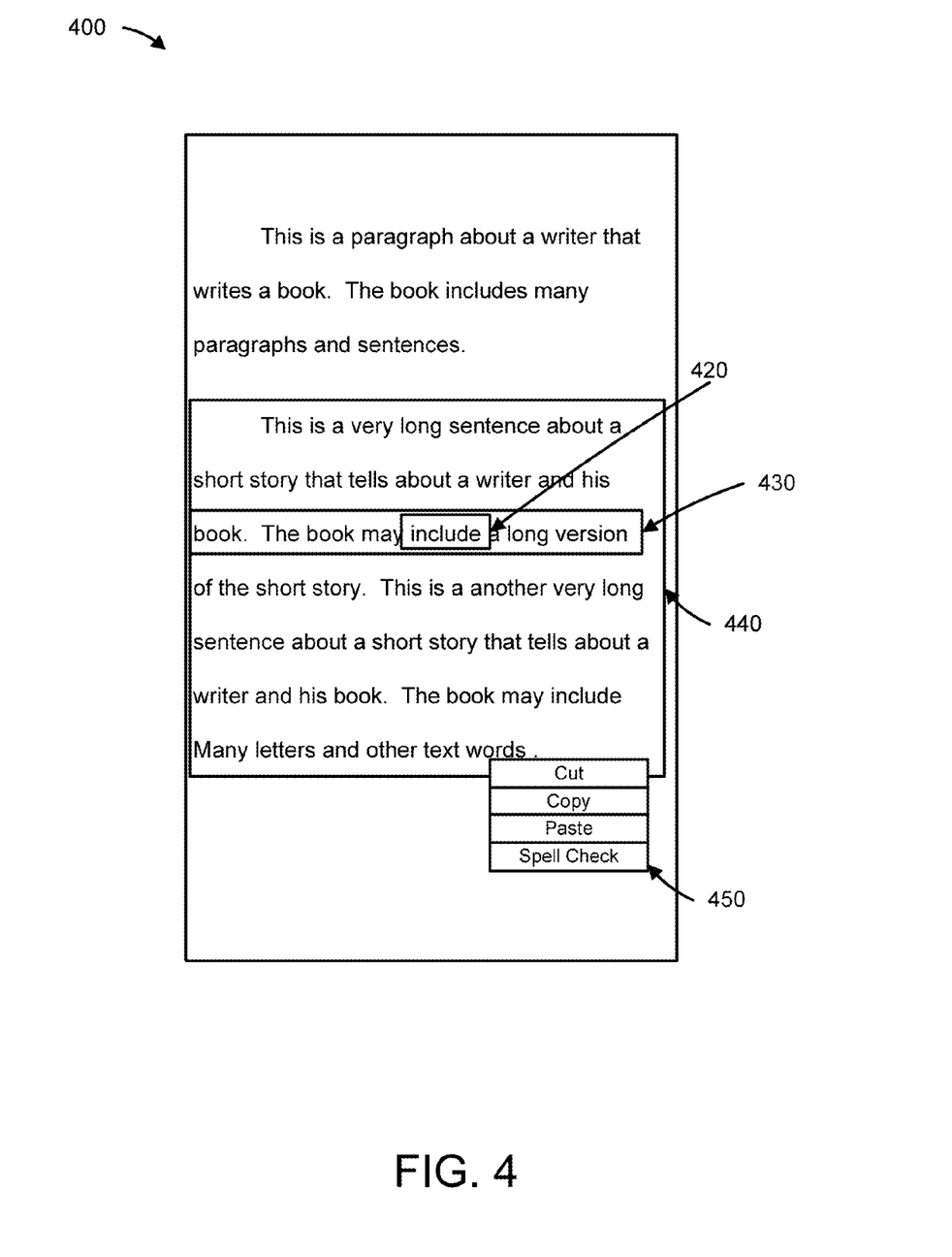
FIG. 4 is an illustration illustrating one embodiment of a touch screen including multiple graphical objects.

FIG. 4 is an illustration illustrating one embodiment of a touch screen including multiple graphical objects. In one embodiment, the graphical objects may be words, paragraphs, or pages, figures, or the like, of a composition. The graphical objects may be typed text, or may be handwritten. In one embodiment, the display module 120 may display many graphical objects, including the graphical object 420.

In one embodiment, the touch module 140 may detect a touch at the graphical object 420. The selection module 160 may detect edges of the graphical object and may expand a selection rectangle to indicate the graphical object 420, in response to the pressure module 260 sensing an increased pressure at the graphical object 420. In response to additional pressure sensed by the pressure module 260, the selection module 160 may increase the indicated portion of the display to include neighboring words. In another embodiment, in response to a duration of the touch, the selection module 160 may increase the indicated portion of the display to include neighboring words of the composition. Neighboring words of a graphical object may include words before or after an indicated word, words in a common sentence of the indicated word, words in a common line of the indicated word, words in a common paragraph of the indicated word, words displayed in a common page of the indicated word, words included in a common chapter of the indicated word, or words included in a common composition of the indicated word. Therefore, in certain embodiments, neighboring words may include an entire composition of text, even though, some of the words of the composition may not be concurrently displayed with the indicated word.

In another embodiment, the touch module 140 may detect a touch at the graphical object 420. The selection module 160 may indicate an initial selection shape that includes substantially the screen, and may contract a selection rectangle to indicate the graphical object, in response to the pressure module 260 sensing an increased pressure at the graphical object 420. In response to additional pressure sensed by the pressure module 260, the selection module 160 may decrease the indicated portion of the display to include a paragraph of text 440. In another embodiment, in response to a duration of the touch, the selection module 160 may decrease the indicated portion of the display to include the paragraph of text 440.

In one example, an initial selection shape may include a word 420 of the text, and the selection module 160 may increase the indicated portion to include a line of text 430. In another example, the selection module 160 may increase the indicated portion to include a sentence the indicated word 420 is in. In response to additional pressure sensed by the pressure module 260, the selection module 160 may increase the selected portion to include a paragraph 440 of the text. In another example, in response to a longer duration of time for the touch, the selection module 160 may increase the selected portion to include a paragraph 440 of the text.

In response to the pressure module 260 sensing a decrease in pressure to substantially zero pressure, the selection module 160 may select a currently indicated portion. In response to the selection module 160 selecting an indicated portion, the action module 240 may display a set of commands 450. In one embodiment, the commands 450 may include cut, copy, paste, spell check, highlight, erase, delete, edit, modify, change font, or other, or the like. In another embodiment, in response the pressure module 260 sensing a decrease in pressure, the selection module 160 may contract the indicated portion of the display from a paragraph 440, to a line 430.

In one example, the touch module 140 may detect a touch at a screen. The touch may be collocated with a displayed word 420. In response to a duration of the touch, the selection module 160 may increase an indicated portion of the display to include the touched word 420. In response to sustained touching (an increase in a duration), the selection module 160 may increase an indicated portion to include a line 430 of the displayed text. The touch module 140 may detect a release of the touch. In response to a release of the touch, the selection module 160 may select the line 430. In response to the selection module 160 selecting the line 430, the action module 240 may display a set of commands. A user may select to copy the selected text and the action module 240 may copy the selected text to a clip board or another memory location.

Figure 5:
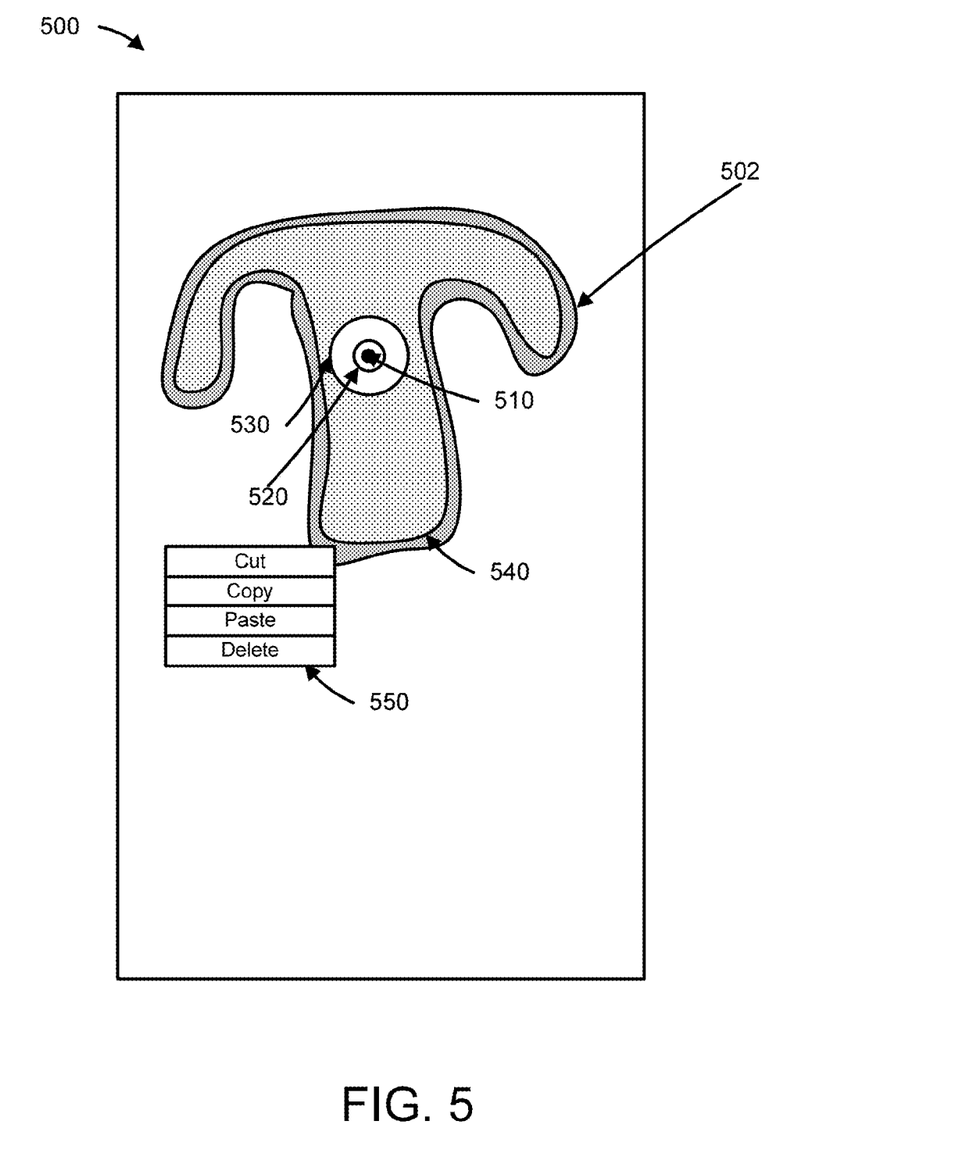
FIG. 5 is an illustration depicting one embodiment of a touch screen display including a graphical object.

FIG. 5 is an illustration depicting one embodiment 500 of a touch screen display including a graphical object. In one embodiment, the display module 120 may depict a graphical object 502. The touch module 140 may detect a touch touching the graphical object 502. In one example, the touch may be detected at a location 510 that is collocated with the graphical object 502. The selection module 160 may indicate an indicated portion 520 of the display in response to the detected touch. The selection module 160 may alter the indicated portion of the touch screen responsive to a characteristic of the touch. A characteristic of the touch may include any property of the touch, including, but not limited to, location, size, pressure, duration, associated gesture, or the like.

In one embodiment, the touch module 140 may detect an increase in pressure for the touch. In response to an increase in pressure the selection module 160 may increase an indicated portion to a larger portion 530. In response to additional pressure, the selection module 160 may determine that an increase in the indicated portion may be similar to detected edges of a graphical object 502. Therefore, the selection module 160 may alter a shape of the indicated portion to coincide with the detected graphical object 502. The selection module 160 may indicate a portion 540 that is substantially similar to the detected graphical object 502. A user may then release the touch, and the touch module 140 may determine that the touch had been released. In response to the touch being released, the selection module 160 may select the currently indicated portion 540. In one example, the selected portion 540 may be similar to the detected graphical object 502.

In response to the touch module 140 detecting a release of the touch, the action module 240 may display a menu of available operations 550. In response to the displayed menu of operations, the touch module 140 may detect a touch at one of the operations and the action module 240 may perform the selected or the indicated operation. Of course, a wide variety of different operations may be displayed and this disclosure is not limited to any specific kind or type of operation.

Figure 6:
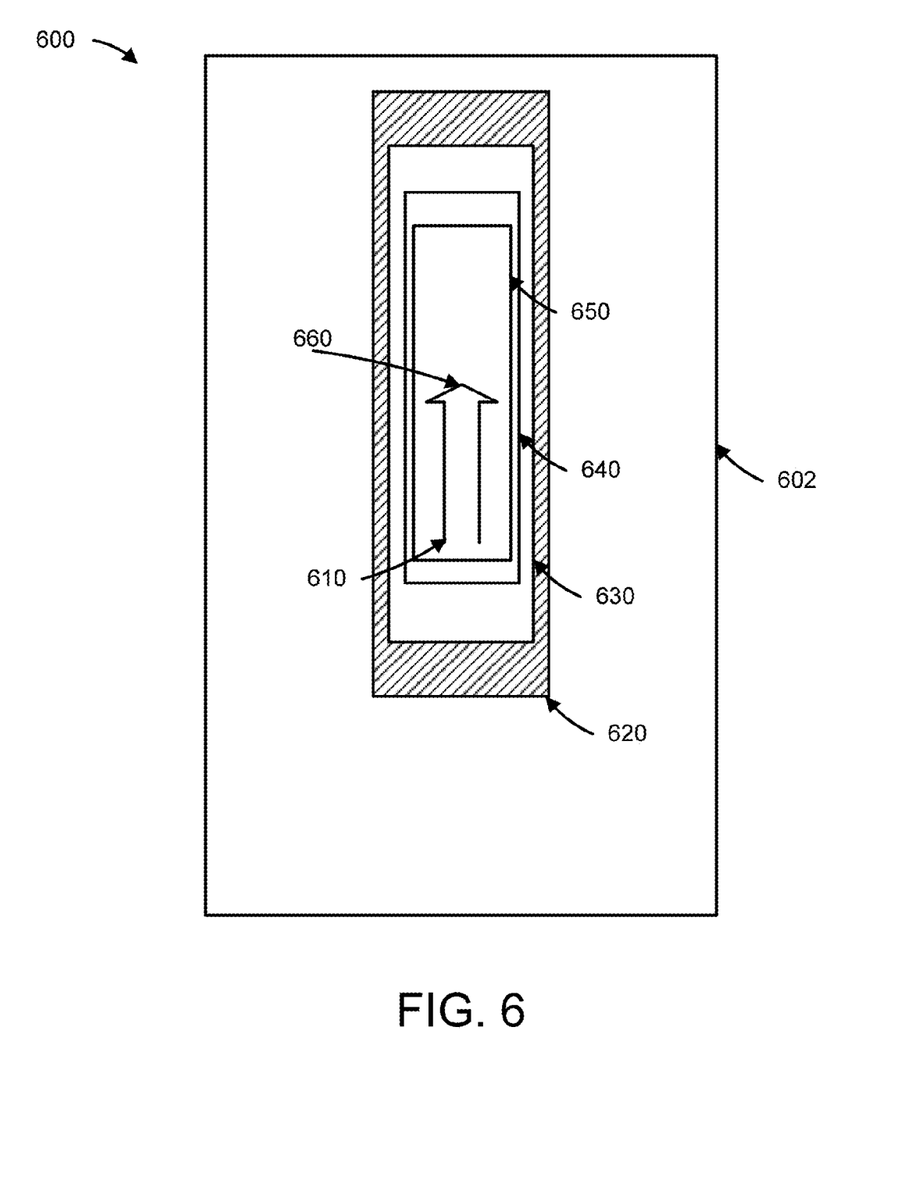
FIG. 6 is another illustration depicting one embodiment of a touch screen display including a graphical object.

FIG. 6 is another illustration depicting one embodiment 600 of a touch screen display including a graphical object 620. In one embodiment, the gesture module 220 may detect a gesture at a touch screen 602. In one example, the gesture may proceed from a lower location 610 to an upper location 660. The gesture module 220 may detect this gesture, and in response, the selection module 160 may indicate an initial selection shape that includes a rectangle 650 centered at the ending point of the gesture. In another example, the selection module 160 may indicate an initial selection shape that is centered at a middle point of the gesture.

In response to the detected touch being sustained by a user, or other, the touch module 140 may detect an increased duration of the touch, and may increase the size of the selection shape 650 to a larger rectangle 640. In response to a longer duration of the touch, the selection module 160 may again increase a size of the selection shape to a larger rectangle 630. In response to the touch being sustained, the selection module 160 may determine detected edges of the graphical object 620, and may snap the indicated portion to coincide with the detected edges of the graphical object 620.

Figure 7:
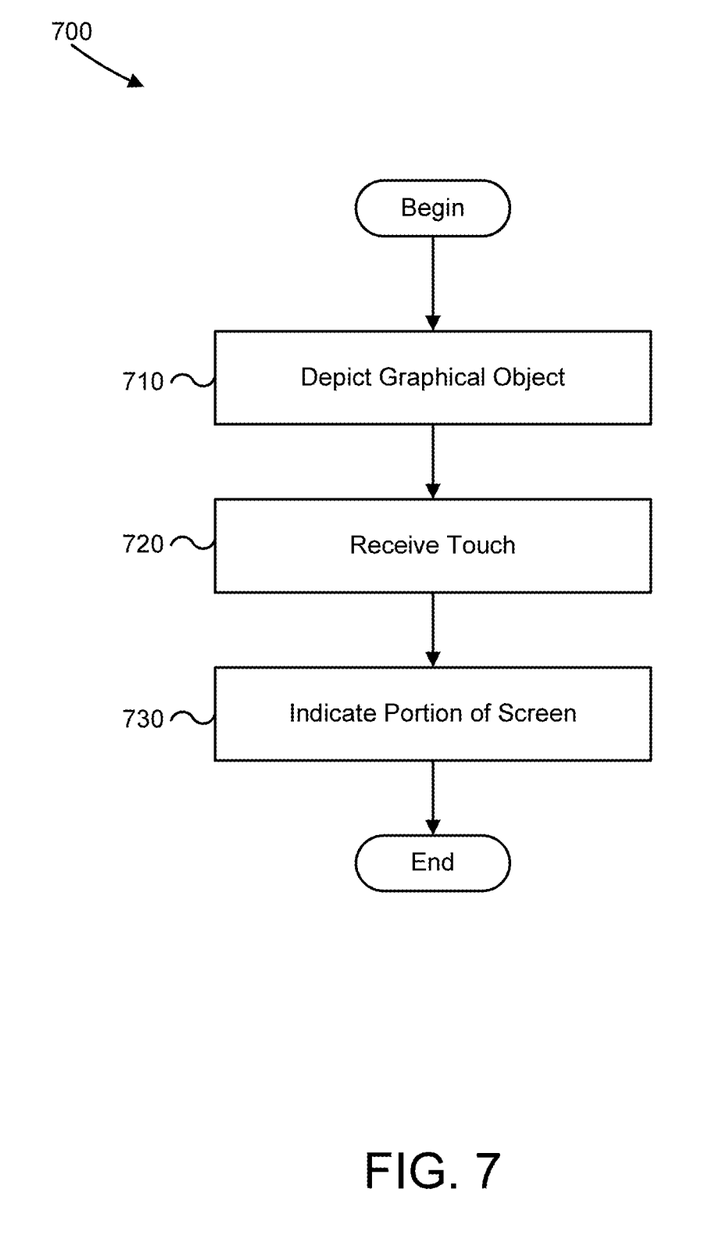
FIG. 7 is schematic flow chart diagram illustrating one embodiment of a method for touch screen selection of graphical objects.

FIG. 7 is schematic flow chart diagram illustrating one embodiment of a method 700 for touch screen selection of graphical objects. In one embodiment, the method 700 may begin and the display module 120 may display 710 a graphical object at a screen. In another embodiment, the method 700 may include the touch module 140 receiving 720 a touch at a screen. In a further embodiment, the method 700 may include the selection module 160 indicating 730 a portion of the screen and the method 700 may end.

Figure 8:
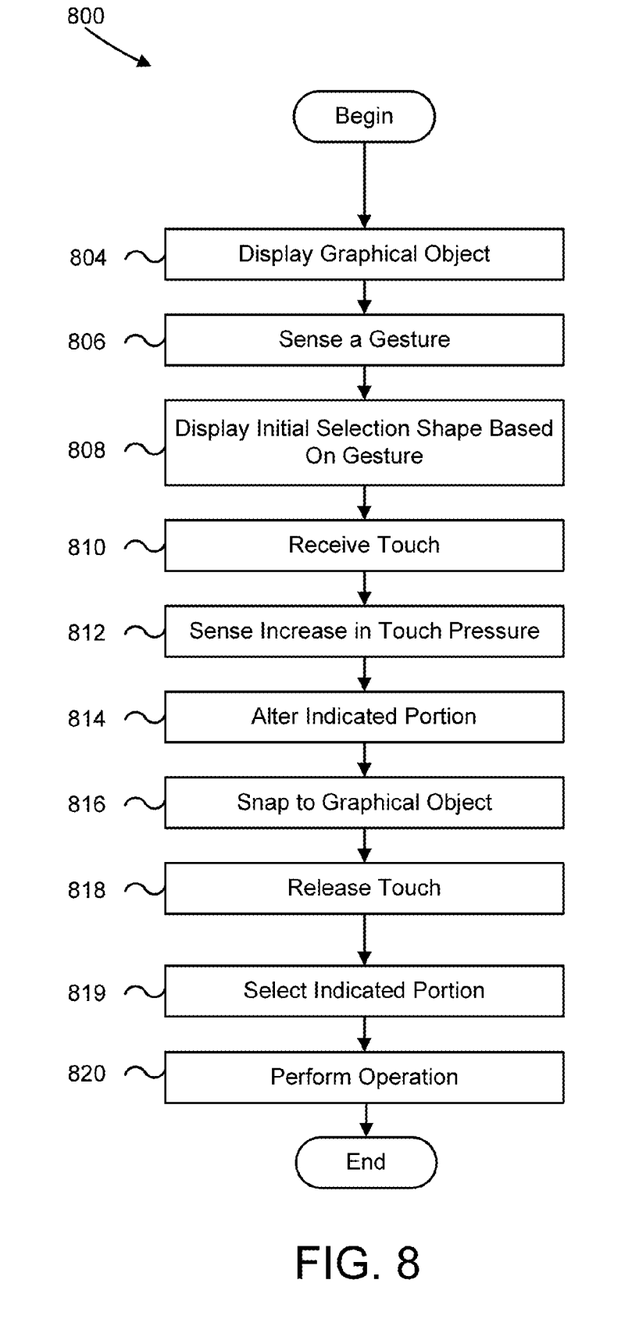
FIG. 8 is another schematic flow chart diagram illustrating one embodiment of a method for touch screen selection of graphical objects.

FIG. 8 is another schematic flow chart diagram illustrating one embodiment 800 of a method for touch screen selection of graphical objects. In one embodiment, the method may being and the display module 120 may display 804 a graphical object.

The gesture module 220 may sense 806 a gesture. The selection module 160 may display 808 an initial selection shape based on the sensed gesture. The touch module 140 may receive 810 a touch. The touch module 140 may sense 812 an increase in an amount of pressure for the touch. The selection module 160 may alter 814 the indicated portion in response to the sensed increase in pressure. The selection module 160 may snap 816 the indicated portion to a detected graphical object. The touch module 140 may detect 818 a release of the touch. The selection module 160 may select 819 the indicated portion. The action module 240 may perform 820 one or more operations on the selected portion and the method may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a touch screen operatively coupled to the processor;
   a display module that depicts a graphical object on the touch screen;
   a touch module that receives an input of a touch on the touch screen, the touch touching an area defined within the graphical object;
   a gesture module that determines a shape of a selection based on a gesture associated with the touch; and
   a selection module that selects a portion of the graphical object responsive to a characteristic of the touch on the touch screen, the selected portion beginning at a point of the touch on the touch screen and expanding around the point of the touch in a shape defined by the gesture associated with the touch in response to one or more of an increased pressure of the touch and a duration of the touch until the selected portion expands to one or more edges of the graphical object, wherein the selection module snaps one or more edges of the shape defining the selected portion to one or more edges of the graphical object to fill the contours of the graphical object in response to the selected portion expanding to one or more edges of the graphical object.

2. The apparatus of claim 1, wherein the selection module further selects the selected portion, the apparatus further comprising an action module that performs one or more operations on the selected portion, the operations selected from the group consisting of cutting, pasting, editing, deleting, spell checking, highlighting, altering, converting, and moving.

3. The apparatus of claim 1, wherein the characteristic of the touch is selected from the group consisting of a detected pressure, a detected size, and a detected duration.

4. The apparatus of claim 3, wherein the touch module further comprises a pressure module that senses the amount of pressure of the touch.

5. The apparatus of claim 3, wherein selecting the selected portion comprises increasing a size of the selected portion responsive to a characteristic of the touch, the characteristic selected from the group consisting of a detected pressure and a detected duration.

6. The apparatus of claim 5, wherein the graphical object is selected from the group consisting of a letter, a word, a sentence, a paragraph, and a composition, the selected portion beginning at the graphical object and increasing to indicate neighboring graphical objects.

7. A method comprising:
displaying, by use of a processor, a graphical object on a touch screen;
receiving an input of a touch of the graphical object on the touch screen, the touch touching an area defined within the graphical object;
determining a shape of a selection based on a gesture associated with the touch;
selecting portion of the graphical object responsive to a characteristic of the touch on the touch screen, the selected portion beginning at a point of the touch on the touch screen and expanding around the point of the touch in a shape defined by the gesture associated with the touch in response to one or more of an increased pressure of the touch and a duration of the touch until the selected portion expands to one or more edges of the graphical object; and
snapping one or more edges of the shape defining the selected portion to one or more edges of the graphical object to fill the contours of the graphical object in response to the selected portion expanding to one or more edges of the graphical object.

8. The method of claim 7, wherein the characteristic is selected from the group consisting of a detected amount of pressure, a detected size, and a detected duration.

9. The method of claim 8, wherein a rate of change for the selected portion is based on the detected pressure.

10. The method of claim 8, wherein a size of the selected portion is based on the detected pressure.

11. The method of claim 8, wherein the graphical object comprises text the touch touching a word of the text, the selected portion beginning at the word and increasing to select neighboring words responsive to a characteristic of the touch.

12. The method of claim 11, wherein the neighboring words are selected from the group consisting of a line, multiple lines, a sentence, a paragraph, a page, a chapter, and a composition.

13. The method of claim 7, further comprising:
responsive to selecting a selected portion of the screen, selecting the selected portion of the touch screen; and
performing one or more operations on the selected portion, the operations selected from the group consisting of cutting the selected portion, pasting the selected portion, highlighting the selected portion, editing the selected portion, deleting the selected portion, spell checking the selected portion, altering the selected portion, and moving the selected portion.

14. A program product comprising a non-transitory computer readable storage medium that stores code executable by a processor to perform:
displaying a graphical object on a touch screen device;
receiving an input of a touch of the touch screen device, the touch touching an area defined within the graphical object;
determining a shape of a selection based on a gesture associated with the touch;
selecting a portion of the graphical object responsive to a characteristic of the touch on the touch screen, the selected portion beginning at a point of the touch on the touch screen and expanding around the point of the touch in a shape defined by the gesture associated with the touch in response to one or more of an increased pressure of the touch and a duration of the touch until the selected portion expands to one or more edges of the graphical object; and
snapping one or more edges of the shape defining the selected portion to one or more edges of the graphical object to fill the contours of the graphical object in response to the selected portion expanding to one or more edges of the graphical object.

15. The computer program product of claim 14, wherein the characteristic of the touch is selected from the group consisting of a detected pressure, a detected size, and a detected duration.

* * * * *